United States Patent
Tanno et al.

(10) Patent No.: US 11,999,201 B2
(45) Date of Patent: Jun. 4, 2024

(54) PNEUMATIC TIRE

(71) Applicant: The Yokohama Rubber Co., LTD., Tokyo (JP)

(72) Inventors: Atsushi Tanno, Kanagawa (JP); Daichi Watabe, Kanagawa (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 392 days.

(21) Appl. No.: 17/309,979

(22) PCT Filed: Dec. 12, 2019

(86) PCT No.: PCT/JP2019/048691
§ 371 (c)(1),
(2) Date: Jul. 7, 2021

(87) PCT Pub. No.: WO2020/145020
PCT Pub. Date: Jul. 16, 2020

(65) Prior Publication Data
US 2022/0072914 A1     Mar. 10, 2022

(30) Foreign Application Priority Data
Jan. 9, 2019   (JP) .................................. 2019-002079

(51) Int. Cl.
*B60C 19/00*      (2006.01)
(52) U.S. Cl.
CPC .................................. *B60C 19/002* (2013.01)
(58) Field of Classification Search
CPC .................................................. B60C 19/002
(Continued)

(56) References Cited

U.S. PATENT DOCUMENTS

2012/0291933 A1   11/2012   Tanno et al.
2017/0151839 A1    6/2017   So et al.

FOREIGN PATENT DOCUMENTS

JP   2006-44503 A    2/2006
JP   2008-149461 A   7/2008
(Continued)

OTHER PUBLICATIONS

Byeon. KR102229485. ESpaceNet Machine Translation. 2019 (Year: 2023).*

*Primary Examiner* — Katelyn W Smith
*Assistant Examiner* — Alexander D Booth
(74) *Attorney, Agent, or Firm* — Thorpe North & Western

(57) ABSTRACT

On a pneumatic tire, a sound absorbing member is installed on an inner surface of a tread portion via a surface fastener including a pair including a hook member and a loop member, the hook member including hook-shaped elements on one surface and being fixed to the tire inner surface, and the loop member being provided with loop-shaped elements engageable with the hook-shaped elements and being fixed to the sound absorbing member. In a meridian cross-section, the loop member has at least one section partially fixed in a tire width direction to the sound absorbing member. Given a fixed region in which the loop member is fixed to the sound absorbing member, and a non-fixed region in which the loop member is not fixed to the sound absorbing member, an engaging region in which the loop member and the hook member engage each other is on the non-fixed region.

7 Claims, 14 Drawing Sheets

(58) Field of Classification Search
USPC .................................................. 152/154.1
See application file for complete search history.

(56) References Cited

FOREIGN PATENT DOCUMENTS

| | | | |
|---|---|---|---|
| JP | 2008-254658 A | | 10/2008 |
| JP | 2012-126233 A | | 7/2012 |
| JP | 2016-94029 A | | 5/2016 |
| KR | 102229485 A | * | 10/2019 |
| WO | 2010/044412 A1 | | 4/2010 |
| WO | 2016/088428 A1 | | 6/2016 |

* cited by examiner

PNEUMATIC TIRE

TECHNICAL FIELD

The present technology relates to a pneumatic tire in which a sound absorbing member is provided on a tire inner surface by using a surface fastener, and particularly relates to a pneumatic tire that can improve engagement force between the tire inner surface and the surface fastener by way of a fixing configuration between the tire inner surface, the surface fastener, and the sound absorbing member, and can effectively prevent the sound absorbing member from falling off from the tire inner surface.

BACKGROUND ART

In recent years, one proposed method of reducing tire noise (in particular, cavernous resonance caused by the vibration of the air filled in a cavity portion (tire cavity) formed in a tire when the tire is mounted on a rim) is to introduce a sound absorbing member formed of a porous material, such as a sponge, in the tire cavity. Such a sound absorbing member may be installed, for example, by a surface fastener due to ease of the attachment/detachment thereof (see, for example, Japan Unexamined Patent Publication No. 2012-126233).

A surface fastener generally includes a pair made up of a hook member and a loop member, the hook member being provided with a plurality of hook-shaped engaging elements on one surface and the loop member being provided with loop-shaped engaging elements that can engage with the hook-shaped engaging elements. Thus, when a sound absorbing member is installed on a tire inner surface by using such a surface fastener, the sound absorbing member is placed on the tire inner surface by, for example, fixing the hook member to the tire inner surface, fixing the loop member to a surface of the sound absorbing member, and engaging the hook member with the loop member. However, due to the structure of the surface fastener including the hook member and the loop member, both types of members are engaged with each other by the relatively flexible loop member (the loop-shaped engaging elements) catching on the relatively rigid hook member (the hook-shaped engaging elements), and thus when both the hook member and the loop member are fixed to the tire inner surface and the sound absorbing member as described above, the flexibility of the loop member is impaired, and good engagement force may not be exerted. Accordingly, there is a demand for measures that improve the engagement force between the tire inner surface and the surface fastener by improving the fixing configuration between the tire inner surface, the surface fastener, and the sound absorbing member.

SUMMARY

The present technology provides a pneumatic tire that, when providing a sound absorbing member on a tire inner surface by using a surface fastener, can improve engagement force between the tire inner surface and the surface fastener, and can effectively prevent the sound absorbing member from falling off from the tire inner surface.

A pneumatic tire according to an embodiment of the present technology includes a tread portion extending in a tire circumferential direction and having an annular shape, a pair of sidewall portions respectively disposed on both sides of the tread portion, and a pair of bead portions each disposed on an inner side of the pair of the sidewall portions in the tire radial direction, the pneumatic tire being provided with a sound absorbing member on an inner surface of the tread portion by using a surface fastener, the surface fastener including a pair made up of a hook member and a loop member, the hook member being provided with a plurality of hook-shaped engaging elements on one surface and being fixed to the tire inner surface, and the loop member being provided with loop-shaped engaging elements that can engage with the hook-shaped engaging elements and being fixed to the sound absorbing member, in a meridian cross-section, the loop member having at least one section partially fixed in a tire width direction to the sound absorbing member, a fixed region being a region in which the loop member is fixed to the sound absorbing member, a non-fixed region being a region in which the loop member is not fixed to the sound absorbing member, and an engaging region in which the loop member and the hook member engage with each other being disposed on the non-fixed region.

According to an embodiment of the present technology, as described above, when fixing the loop member to the sound absorbing member, the fixed region and the non-fixed region are provided without fixing the entire surface of the loop member to the sound absorbing member, and thus the loop member and the sound absorbing member are reliably fixed in the fixed region, while the flexibility of the loop member can be maintained without being fixed in the non-fixed region. As a result, when the hook member and the loop member engage with each other in the engaging region disposed on the non-fixed region, the loop member with retained flexibility will work well on the hook member, thereby enabling increasing the engagement force of the surface fastener.

According to an embodiment of the present technology, at least a pair of fixed regions can be configured to be present on both sides of the non-fixed region including the engaging region in the tire width direction. As a result, the balance and placement between the fixed region and the non-fixed region (the engaging region) are improved, which is advantageous in increasing the engagement force of the surface fastener.

In this embodiment, a surface length L0 of a portion of the sound absorbing member which is covered by the loop member between the pair of fixed regions adjacent to the non-fixed region including the engaging region is preferably from 1.2 times to 6.0 times a width W of the engaging region. As a result, the relationship between the width W of the engaging region and the length L0 (that is, the spacing between the fixed regions located on both sides of the engaging region) is improved, which is advantageous in increasing the engagement force of the surface fastener.

Additionally, in this embodiment, a ratio L1/L0 of a length L1 of the non-fixed region of the loop member to the surface length L0 of a portion of the sound absorbing member that is covered by the loop member between the pair of fixed regions adjacent to the non-fixed region including the engaging region is preferably in a range of from 1.01 to 1.5. As a result, a relationship between the length L0 and the length L1 (that is, the extent of loosening of the loop member with respect to the spacing between the fixed regions located on both sides of the engaging region) is improved, which is advantageous in increasing the engagement force of the surface fastener.

According to an embodiment of the present technology, preferably, the sound absorbing member is a band-like member extending in the tire circumferential direction, and has a missing portion in which the sound absorbing member is not present in at least one section in the tire circumferential direction, and the loop member projects from the sound absorbing member in the tire circumferential direction at least on one end portion of the sound absorbing member facing the missing portion. Expansion of the tire during inflation and/or shearing strain due to rolling on ground can be tolerated for a long period of time by providing the missing portion without the sound absorbing member extending in the entire circumference, which is advantageous in preventing the sound absorbing member from separating. Also, because the loop member protrudes in the tire circumferential direction beyond the sound absorbing member, the engagement area of the surface fastener is ensured, which is advantageous in increasing the engagement force of the surface fastener.

DETAILED DESCRIPTION

Configurations of embodiments of the present technology will be described in detail below with reference to the accompanying drawings.

Figure 1:
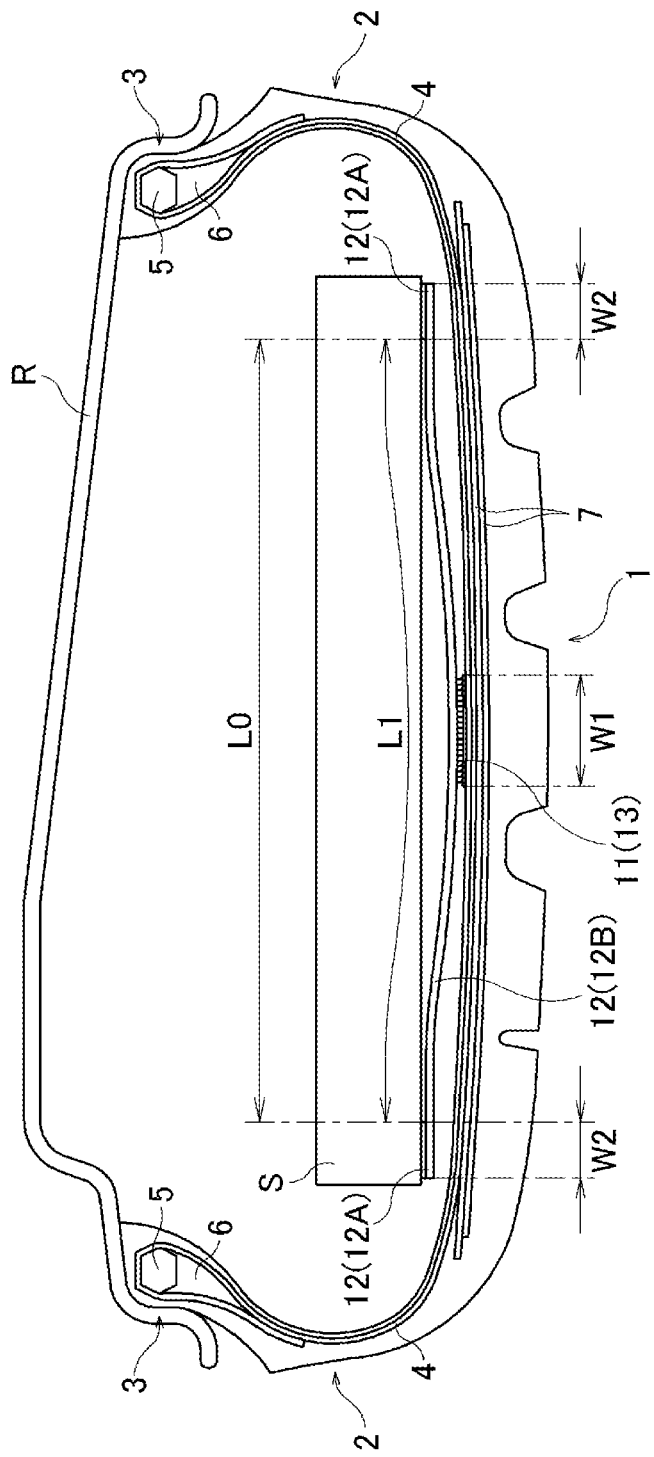
FIG. 1 is a meridian cross-sectional view illustrating a pneumatic tire according to an embodiment of the present technology.

As illustrated in FIG. 1, a pneumatic tire of an embodiment of the present technology includes a tread portion 1, a pair of sidewall portions 2 disposed on both sides of the tread portion 1, and a pair of bead portions 3 disposed in the sidewall portions 2 at an inner side in a tire radial direction. R in the drawings represents a rim on which the pneumatic tire is mounted. Additionally, FIG. 1 is a meridian cross-sectional view, and accordingly, although not illustrated, each of the tread portion 1, the sidewall portions 2, and the bead portions 3 extends in the tire circumferential direction to form an annular shape. Thus, the basic structure of the toroidal shape of the pneumatic tire is configured. Other tire components in the meridian cross-sectional view are also formed in an annular shape extending in the tire circumferential direction unless otherwise indicated.

A carcass layer 4 is mounted between the left-right pair of bead portions 3. The carcass layer 4 includes a plurality of reinforcing cords extending in the tire radial direction, and is folded back around a bead core 5 disposed in each of the bead portions 3 from a tire inner side to a tire outer side. Additionally, bead fillers 6 are disposed on the periphery of the bead cores 5, and each bead filler 6 is enveloped by a main body portion and a folded back portion of the carcass layer 4. On the other hand, in the tread portion 1, a plurality of belt layers 7 (two layers in FIG. 1) are embedded on an outer circumferential side of the carcass layer 4. The belt layers 7 each include a plurality of reinforcing cords that are inclined with respect to the tire circumferential direction, with the reinforcing cords of the different layers arranged in a criss-cross manner. In these belt layers 7, the inclination angle of the reinforcing cords with respect to the tire circumferential direction ranges from, for example, 10° to 40°. In addition, a belt reinforcing layer (not illustrated) can be provided on the outer circumferential side of the belt layers 7. The belt reinforcing layer includes organic fiber cords oriented in the tire circumferential direction, for example. In the belt reinforcing layer, the angle of the organic fiber cords with respect to the tire circumferential direction can be set to, for example, from 0° to 5°.

The present technology relates to an installation configuration used when installing a sound absorbing member as described below with respect to a typical pneumatic tire such as that described above. Thus, the basic cross-sectional structure of the pneumatic tire on which the sound absorbing member is mounted is not limited to the above-described structure.

According to an embodiment of the present technology, a sound absorbing member S is disposed in the tire cavity. The sound absorbing member S includes a porous material such as a sponge. The sound absorbing member S exhibits predetermined sound absorbing properties due to this porous structure. For example, the porous material constituting the sound absorbing member S includes polyurethane foam. The illustrated sound absorbing member S has a substantially quadrangular shape in the meridian cross-section and has a band-like structure extending in the tire circumferential direction. However, the shape of the sound absorbing member S is not particularly limited. Preferably, as in the illustrated example, the structure has a surface facing the tire inner surface and a surface facing the tire inner cavity. Such a structure may have, in addition to the substantially quadrangular cross section illustrated, a surface facing the tire inner surface and a surface facing the tire inner cavity each having curved surfaces, and have a substantially elliptical shape in a meridian cross-section, for example.

The present technology relates to an installation method for installing a sound absorbing member S on a pneumatic tire as described above. As such, the structure, physical properties, and the like of the sound absorbing member S are not particularly limited, except for the dimensions defined by the relationship with the surface fastener described below used when installing the sound absorbing member S on the tire inner surface.

Figure 2:
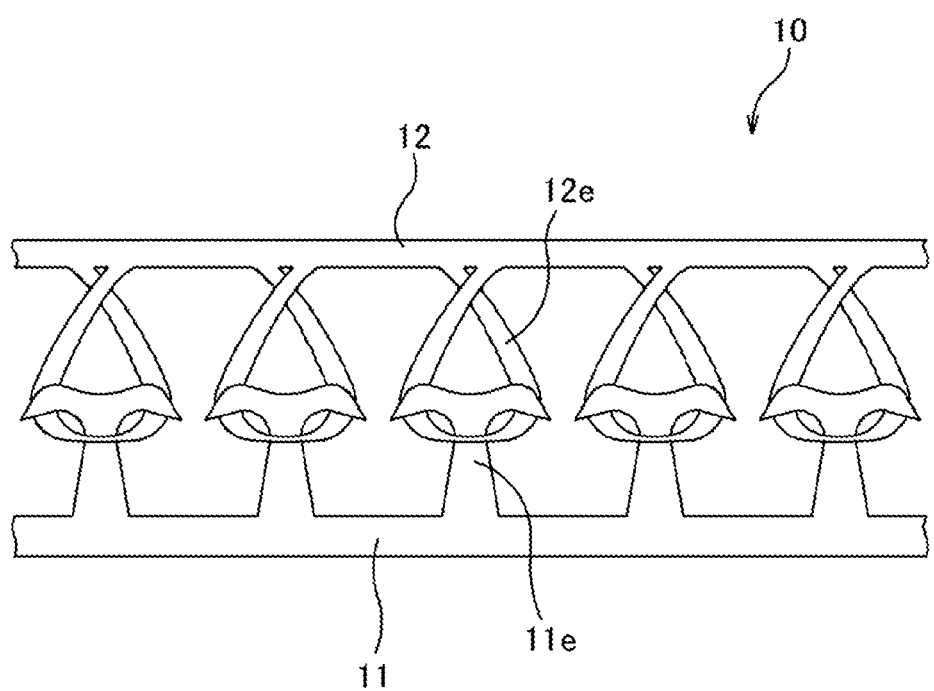
FIG. 2 is an explanatory diagram schematically illustrating an example of a surface fastener according to an embodiment of the present technology.

The sound absorbing member S is disposed on the tire inner surface by a surface fastener 10. As illustrated in FIG. 2, the surface fastener 10 includes a pair made up of a hook member 11 and a loop member 12. The hook member 11 is a member including a plurality of hook-shaped engaging elements 11e on one surface. The loop member 12 is a member provided with loop-shaped engaging elements 12e that can engage with the hook-shaped engaging elements 11e. In a general surface fastener 10 including a pair made up of a hook member 11 and a loop member 12, both members are engaged with each other by the relatively flexible loop member 12 (the loop-shaped engaging elements 12e) catching on the relatively rigid hook member 11 (the hook-shaped engaging elements 11e). FIG. 2 schematically illustrates a state in which the loop member 12 (the loop-shaped engaging elements 12e) is engaged with the hook member 11 (the hook shaped engaging elements 11e). In the actual hook member 11 and the loop member 12, a plurality of hooked engaging elements 11e and loop-shaped engaging elements 12e, as illustrated, are provided over the entirety of one surface of each of the hook members 11 and the loop member 12.

The physical properties of the loop member 12 are not particularly limited, but the elongation ratio measured according to the B method (constant load test of fabric) specified in JIS (Japanese Industrial Standard) L1096 "8.16.1 Elongation percentage" is preferably from 5% to 35%, and more preferably from 10% to 30%. The loop member 12 having such an elongation ratio can flexibly deform moderately with respect to the movement of the sound absorbing member S when the tire is rolling, which is advantageous in preventing the sound absorbing member S from falling off from the tire inner surface.

According to an embodiment of the present technology, as illustrated, the hook member 11 is fixed to the tire inner surface such that the hook-shaped engaging elements 11e face the tire cavity side (the loop member side). The fixing method of fixing the hook member 11 to the tire inner surface is not particularly limited. For example, various methods can be employed such as bonding, welding, or engagement with an engagement member provided separately on the tire inner surface. Because the other surface of the hook member 11 is a surface that is fixed to the tire inner surface, the other surface of the hook member 11 is preferably processed into a structure corresponding to a fixing method of fixing the hook member 11 to the tire inner surface (for example, a smooth surface in the case of bonding). Preferably, the other surface of the hook member 11 is entirely fixed to the tire inner surface.

Figure 3:
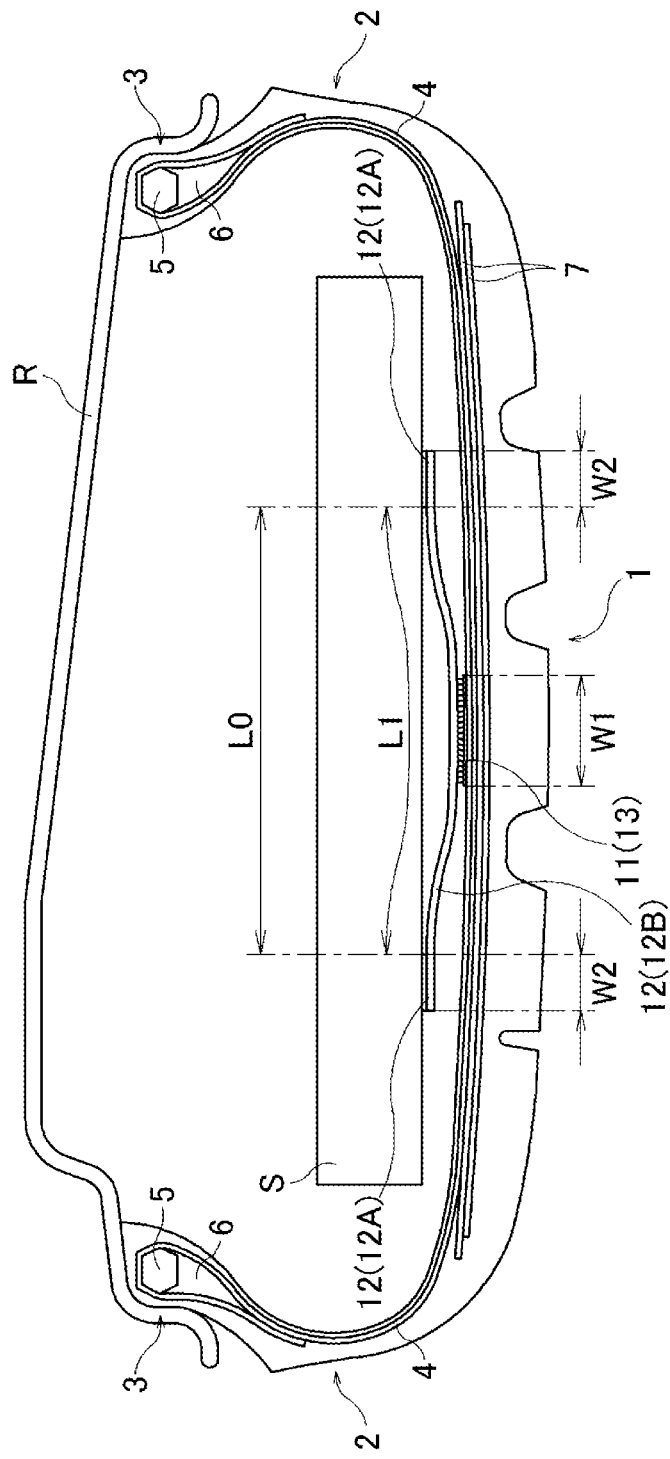
FIG. 3 is a meridian cross-sectional view illustrating a pneumatic tire according to another embodiment of the present technology.

At least one hook member 11 is provided on the tire inner surface in the tire meridian cross-section illustrated in the drawings. The position at which the hook member 11 is fixed is set in accordance with the arrangement of the sound absorbing member S that is disposed on the tire inner surface. However, when one hook member 11 is provided as illustrated in FIGS. 1 and 3, the hook member 11 is preferably provided at or near the center in the tire width direction. Additionally, when two or more (two in the illustrated example) hook members 11 are provided as in FIGS. 4 and 5, the hook members 11 are preferably disposed at intervals, preferably evenly in the tire width direction.

Figure 6:
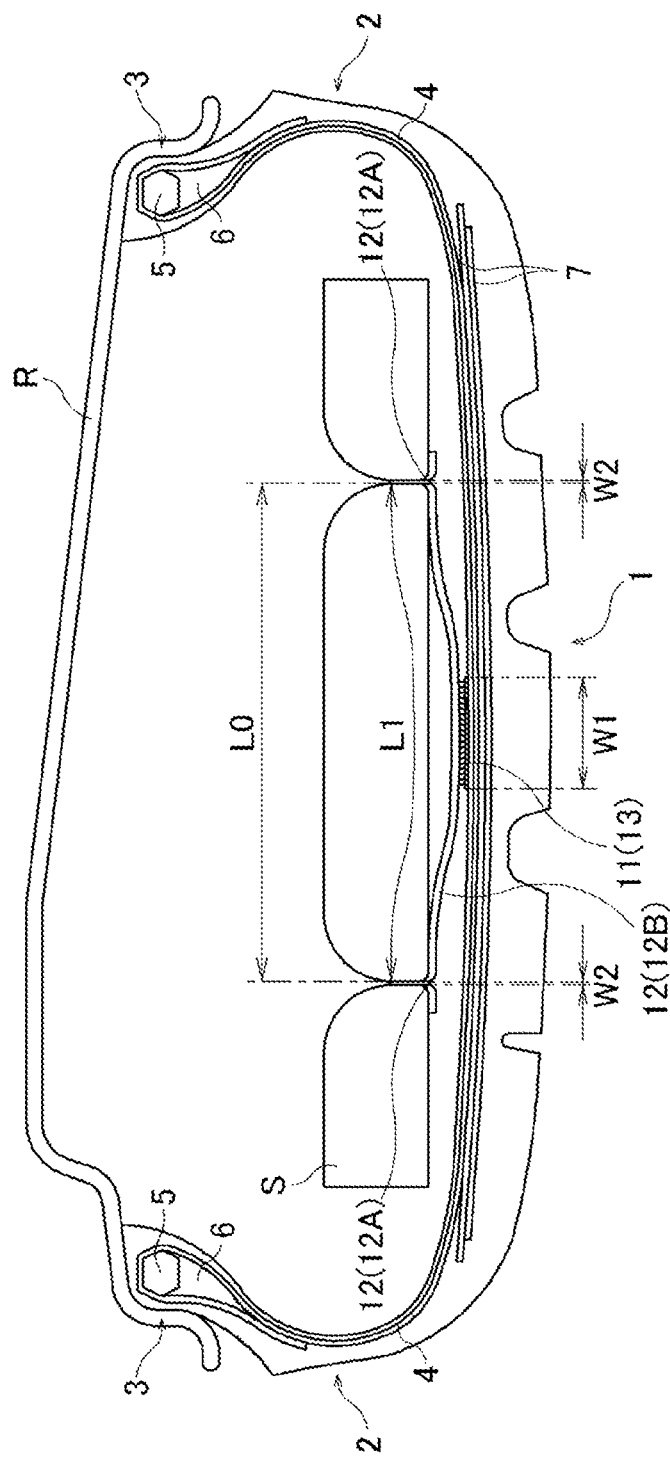
FIG. 6 is a meridian cross-sectional view illustrating a pneumatic tire according to another embodiment of the present technology.

According to an embodiment of the present technology, as illustrated, the loop member 12 is fixed to the sound absorbing member such that the loop-shaped engaging elements 12e face the tire inner surface side (the hook member side). The fixing method of fixing the loop member 12 to the sound absorbing member is not particularly limited. For example, various methods can be employed such as bonding, welding, or engagement with an engagement member provided separately on the tire inner surface. Also, when the loop member 12 includes a fabric material provided on the surface with engaging elements 12e formed of loop-shaped fibers, as illustrated in FIG. 6, the loop member 12 can be sewn to the sound absorbing member S with a thread using a sewing machine or the like. Note that in FIG. 6, the sound absorbing member S is also compressed and fixed at the sewing site. The other surface of the loop member 12 is a surface that is fixed to the tire inner surface, and thus the other surface of the loop member 12 is preferably processed into a structure corresponding to the fixing method. Alternatively, depending on the structure of the loop member 12 (for example, when the loop member 12 includes the same fabric material on front and back), loop-shaped engaging elements 12e may also be present on the other surface.

In the tire meridian cross-section illustrated in the drawings, the loop member 12 is not fixed completely to the sound absorbing member S in the tire width direction, and at least one section in the tire width direction is partially fixed to the sound absorbing member S. As a result, a fixed region 12A that is fixed to the sound absorbing member S and a non-fixed region 12B that is not fixed to the sound absorbing member S are formed in the loop member 12. In other words, in the tire meridian cross-section, the loop member 12 has a structure in which at least one fixed region 12A and at least one non-fixed region 12B are aligned in the tire width direction, and the fixed region 12A is partially disposed on the surface of the sound absorbing member S.

Here, assuming that an engaging region 13 is a region where the loop member 12 and the hook member 11 engage with each other, the engaging region 13 is disposed in the non-fixed region 12B on the loop member 12 side. Note that, in the illustrated example, the loop member 12 is provided with the loop-shaped engaging elements 12e on the entire region of one surface in the tire width direction, and thus the entire region of one surface of the loop member 12 can engage with the hook member 11. Conversely, in the hook member 11, the hook-shaped engaging elements 11e are provided on the entire region of one surface in the tire width direction, and thus the entire area of one surface of the hook member 11 can engage with the loop member 12. As a result, the entire width of the relatively narrower member (the hook member 11 in the illustrated example) of the hook member 11 and the loop member 12 is the engaging region 13. In other words, in the illustrated example, the hook member 11 and the engaging region 13 substantially match each other. Meanwhile, the fixed region 12A and the non-fixed region 12B of the loop member 12 are at different portions from each other, and thus the engaging region 13 and the fixed region 12A are disposed at positions that do not overlap each other in the tire width direction.

In this manner, when the sound absorbing member S is installed on the tire inner surface using the surface fastener 10, only the fixed region 12A is partially fixed to the sound absorbing member S without fixing the entire surface of the loop member 12 to the sound absorbing member S, and the fixed region 12A and the engaging region 13 do not overlap, and thus the loop member 12 and the sound absorbing member S are reliably fixed in the fixed region 12A, and the flexibility of the loop member 12B can be maintained without being fixed in the non-fixed region 12B. As a result, when the hook member 11 and the loop member 12 engage with each other in the engaging region 13 disposed in the non-fixed region 12B, the loop member 12 (the non-fixed region 12B) with retained flexibility works well on the hook member 11, thereby increasing the engagement force of the surface fastener 10.

It is sufficient that the fixed region 12A and the non-fixed region 12B (the engaging region 13) are provided at least on one section for each region. However, preferably, a plurality of one of the fixed region 12A or the non-fixed region 12B (the engaging region 13) are preferably provided so as to have a positional relationship in which the other of the fixed region 12A or the non-fixed region 12B (the engaging region 13) is sandwiched between the ones adjacent in the tire width direction. For example, in the example illustrated in FIGS. 1 and 3, two fixed regions 12A are provided, while one non-fixed region 12B (the engaging region 13) is provided in between the two fixed regions 12A. Note that in the example illustrated in FIG. 1, a pair of the fixed regions 12A are provided on the outermost side of the sound absorbing member S in the tire width direction. In the example illustrated in FIG. 3, a pair of the fixed regions 12A are provided so as to sandwich the non-fixed region 12B (the engaging region 13) on the inner side in the tire width direction of the outermost end portion in the tire width direction of the sound absorbing member S. In the example illustrated in FIG. 4, two non-fixed regions 12B (the engaging regions 13) are provided, while one fixed region 12A is provided at a position where the fixed region 12A is sandwiched between the two non-fixed regions 12B (the engaging regions 13). In the example illustrated in FIG. 5, three fixed regions 12A and two non-fixed regions 12B (the engaging regions 13) are provided, and the individual non-fixed regions 12B (the engaging regions 13) are disposed at positions that are sandwiched between fixed regions 12A adjacent to each other in the tire width direction. With such an arrangement, a positional relationship between the fixed region 12A and the engaging region 13 is improved, thereby increasing the stability of the sound absorbing member S when the surface fastener 10 is engaged.

Figure 7:
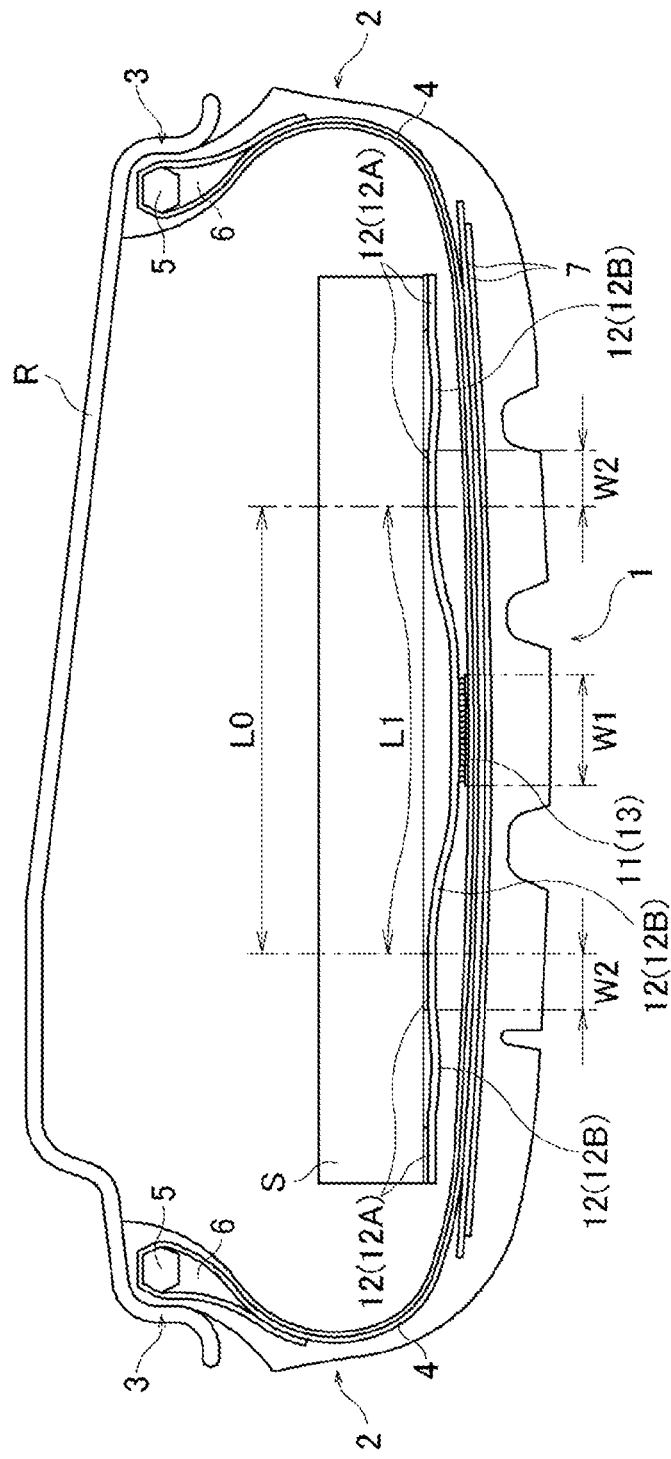
FIG. 7 is a meridian cross-sectional view illustrating a pneumatic tire according to another embodiment of the present technology.

More preferably, as illustrated in FIGS. 1 and 3, at least a pair of the fixed regions 12A are preferably configured to be present on both sides of the non-fixed region 12B including the engaging region 13 in the tire width direction. As a result, the balance and placement between the fixed region 12A and the non-fixed region 12B (the engaging region 13) are improved, which is advantageous in increasing the engagement force of the surface fastener. Note that when two or more pairs of the fixed regions 12A are present on both sides of the non-fixed region 12B including the engaging region 13 in the tire width direction, as illustrated in FIG. 7, the engaging region 13 may not be present in the non-fixed region 12B other than the non-fixed region 12B (the engaging region 13) that is sandwiched in between the pair of fixed regions 12A positioned on the innermost side in the tire width direction.

When at least a pair of the fixed regions 12A are present on both sides of the non-fixed region 12B including the engaging region 13 in the tire width direction in such a manner, the surface length L0 of the sound absorbing member S, which is covered by the loop member 12 between the pair of fixed regions 12A adjacent to the non-fixed region 12B including the engaging region 13, is preferably from 1.2 times to 6.0 times, more preferably, from 1.3 times to 5.0 times the width W1 of the engaging region 13 (the hook member 11). By setting the widths of the portions in this manner, the relationship between the width W1 of the engaging region 13 and the length L0 (that is, the spacing between the fixed regions 12A located on both sides of the engaging region 13) is improved, which is advantageous in increasing the engagement force of the surface fastener. If the surface length L0 is less than 1.2 times the width W1, the flexible movement of the loop member 12 (the non-fixed region 12B) cannot be sufficiently ensured, and thus the effect of increasing the engagement force of the surface fastener 10 is limited. When the surface length L0 is greater than 6.0 times the width W1, the sound absorbing member S becomes excessively large with respect to the engagement force obtained by the engaging region 13, and thus the engagement of the surface fastener 10 during travel may be released.

Figure 8:
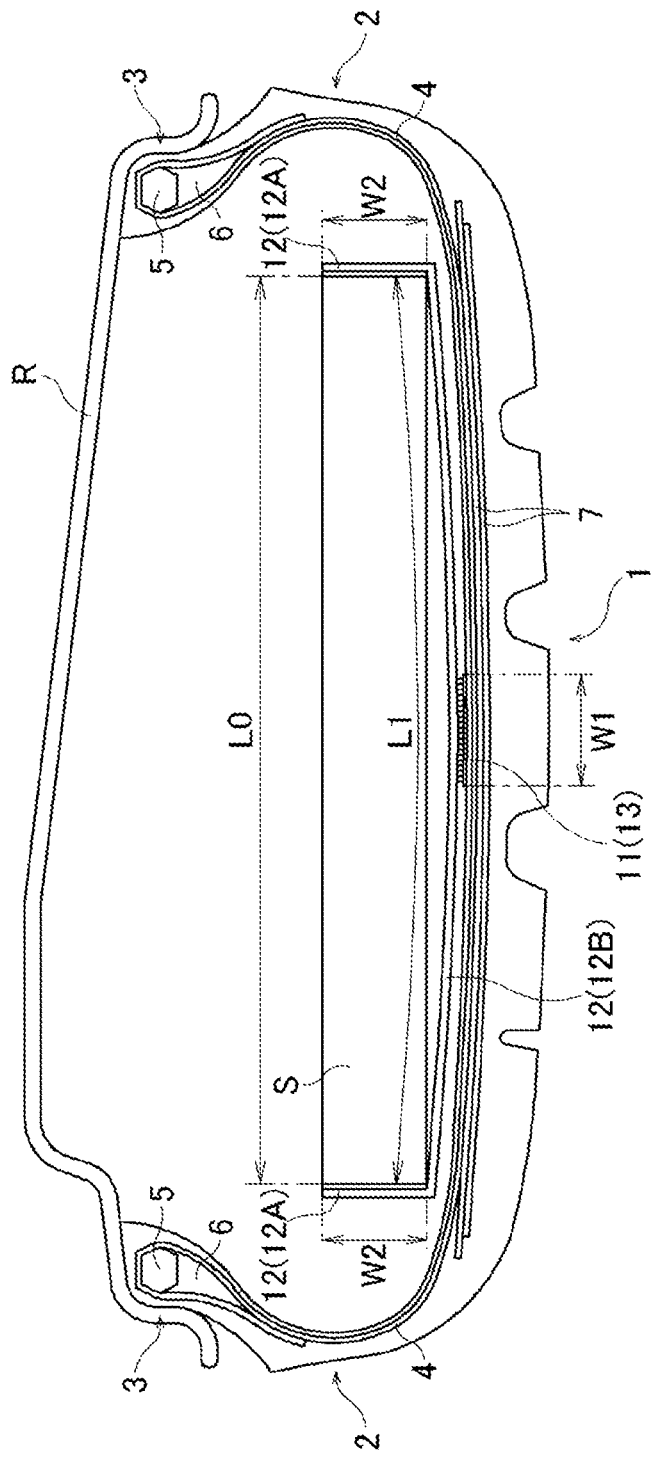
FIG. 8 is a meridian cross-sectional view illustrating a pneumatic tire according to another embodiment of the present technology.
Figure 9:
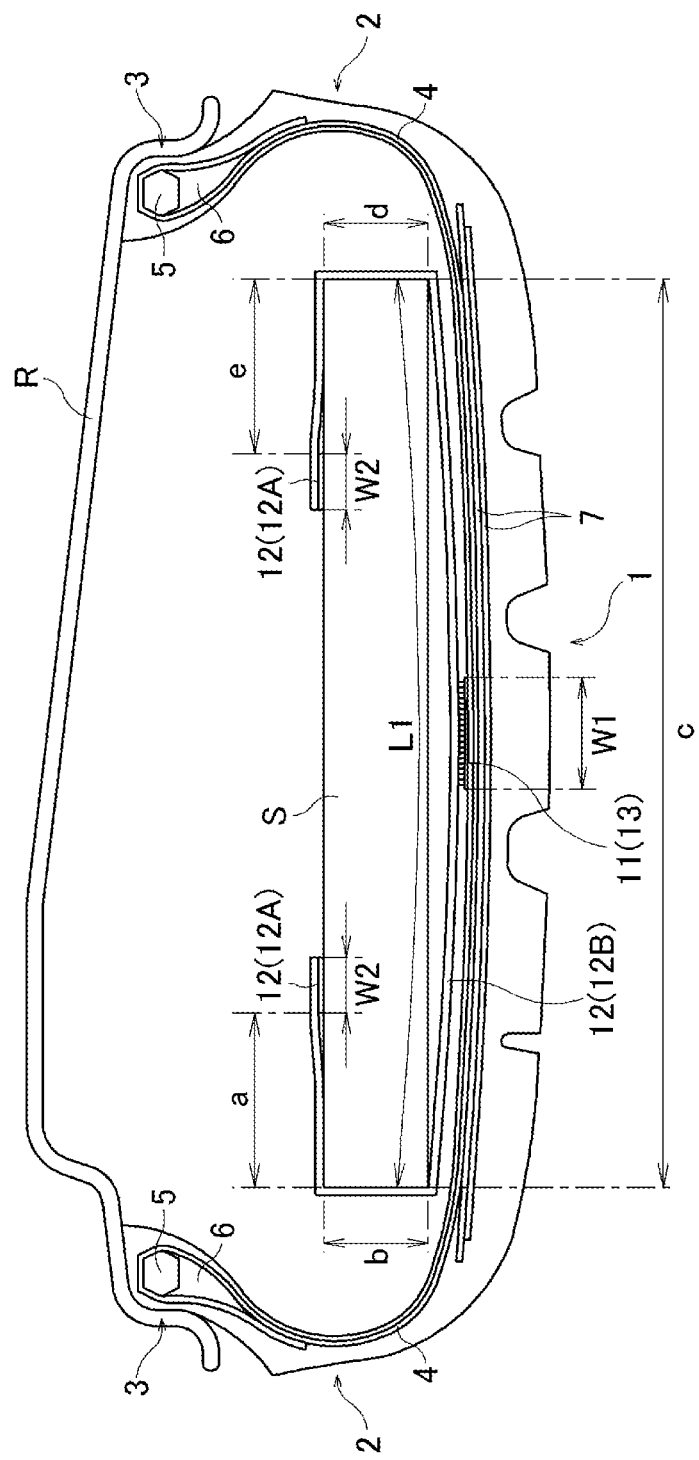
FIG. 9 is a meridian cross-sectional view illustrating a pneumatic tire according to another embodiment of the present technology.

The fixed region 12A need not necessarily be provided on the surface of the sound absorbing member S facing the hook member 11. For example, as illustrated in FIG. 8, the fixed region 12A may be provided on both side surfaces in the tire width direction of the sound absorbing member S having a quadrangular shape in the tire meridian cross-section, or as illustrated in FIG. 9, on the surface of the sound absorbing member S facing the tire cavity (the back side surface of the surface facing the hook member 11). In such an aspect as well, the surface length L0 described above is not the shortest distance between the fixed regions 12A but is a length along the surface of the sound absorbing member S of a portion covered by the loop member 12 as illustrated, and preferably satisfies the range described above. Note that in the example of FIG. 9, the total length denoted as from a to e in the drawing is the length L0.

Figure 4:
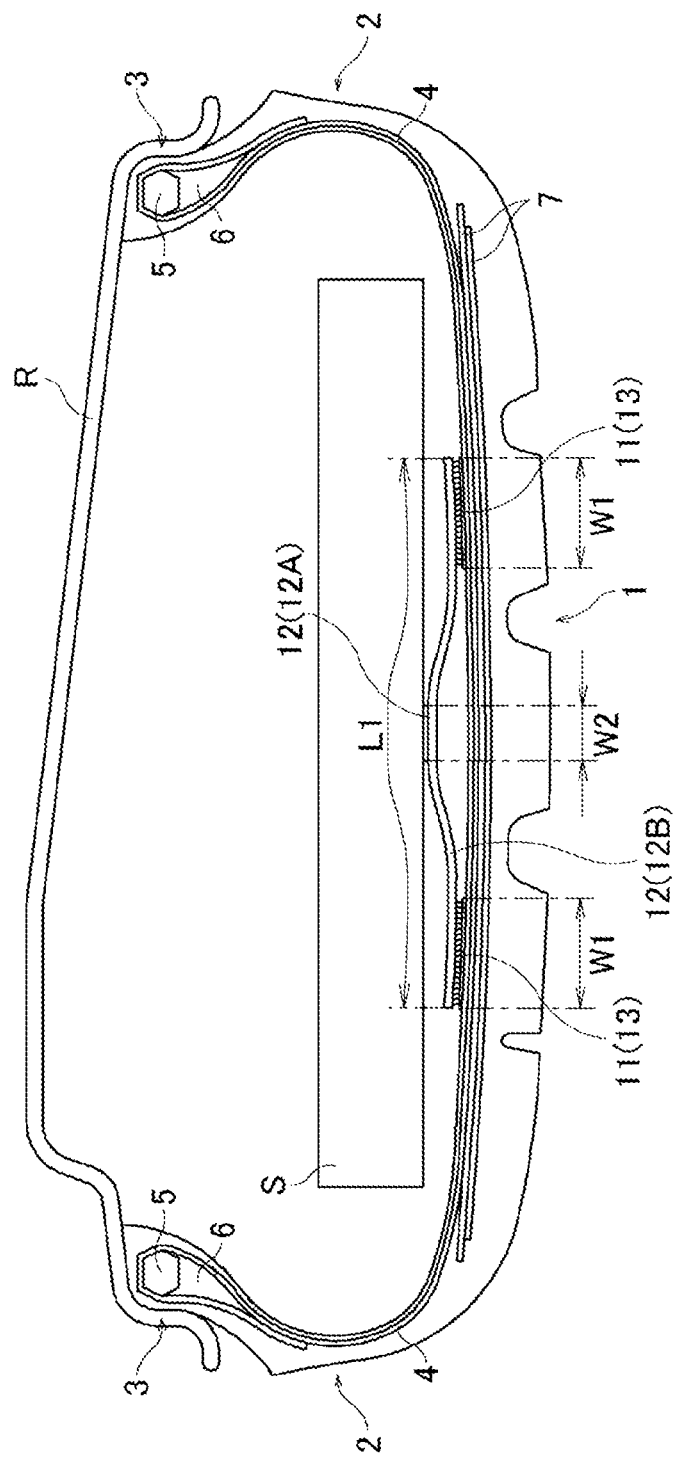
FIG. 4 is a meridian cross-sectional view illustrating a pneumatic tire according to another embodiment of the present technology.
Figure 5:
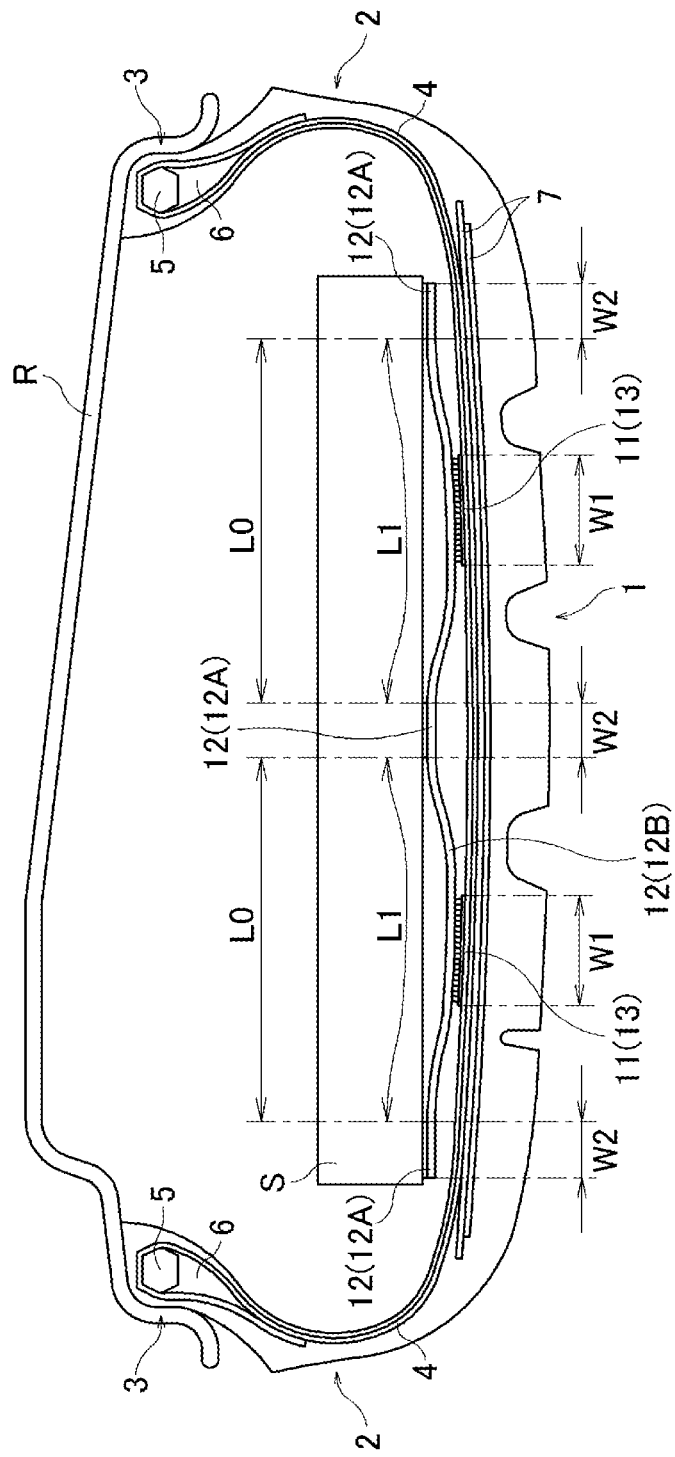
FIG. 5 is a meridian cross-sectional view illustrating a pneumatic tire according to another embodiment of the present technology.

The width W1 of the engaging region 13 (the hook member 11) is not particularly limited provided that the width W1 allows reliable engagement with the sound absorbing member S installed in the tire. Note that the size (volume) of the sound absorbing member S is generally determined based on the tire size and the required sound absorbing performance, and thus the width W1 of the engaging region 13 (the hook member 11) can be calculated based on the appropriate engagement area with respect to the size of the sound absorbing member S assumed from the tire size. Specifically, the width W1 of the engaging region 13 (the hook member 11) is preferably from 10% to 40%, more preferably from 12% to 38% of the nominal width of the tire. As a result, the engagement force can be ensured while sufficient sound absorbing performance is ensured according to the tire size. Note that when a plurality of the engaging regions 13 (the hook members 11) are provided as illustrated in FIGS. 4 and 5, the total width of each engaging region 13 (the hook member 11) preferably satisfy the range described above.

Conversely, when using the width W1 of the engaging region 13 (the hook member 11) as a reference, the width of the sound absorbing member S is preferably from 2 times to 8 times the width W1 of the engaging region 13 (the hook member 11). If the width of the sound absorbing member S is less than twice the width W1 of the engaging region 13 (the hook member 11), the engagement force caused by the surface fastener 10 is excessive. If the width of the sound absorbing member S is greater than 8 times the width W1 of the engaging region 13 (the hook member 11), the sound absorbing member S becomes excessively large with respect to the engagement force obtained by the engaging region 13, and the engagement force may not be sufficiently ensured.

The width W2 of the fixed region 12A is also not particularly limited as long as the loop member 12 can be reliably fixed to the sound absorbing member S. However, the width W2 is preferably set to be 50 mm or less in order to sufficiently secure the non-fixed region 12B. Also, when the loop member 12 is fixed to the sound absorbing member S using a method such as bonding, welding, or engaging (when the fixed region 12A has a width), the width W2 of the fixed region 12A is preferably set to 5 mm or greater. Alternatively, as illustrated in FIG. 6, when the loop member 12 is sewn to the sound absorbing member S, the fixed region 12A is formed into a linear shape extending in the tire circumferential direction, having no substantial width (strictly speaking, the thickness of the thread used for sewing is the width of the fixed region 12A), and thus the width W2 of the fixed region 12A is preferably set to not less than 0 mm, and more preferably not less than 1 mm. The width W2 of the fixed region 12A that is smaller than the range described above may cause the loop member 12 to fall off from the sound absorbing member S. The width W2 of the fixed region 12A that is greater than 50 mm causes the used amount of loop member 12 to be excessive. Note that when a plurality of the fixed regions 12A are provided as in FIG. 1 or the like, the total width of each of the fixed regions 12A preferably satisfies the range described above.

When at least a pair of fixed regions 12A are present on both sides of the non-fixed region 12B including the engaging region 13 in the tire width direction as described above, the ratio L1/L0 of the length L1 of the non-fixed region 12B of the loop member 12 to the surface length L0 of a portion of the sound absorbing member S that is covered by the loop member 12 between the pair of fixed regions 12A adjacent to the non-fixed region 12B including the engaging region 13 is preferably in a range of from 1.01 to 1.50, and more preferably from 1.05 to 1.30. By setting the relationship between the length L0 and the length L1 in this manner, the loop member 12 is appropriately loosened with respect to the spacing between the fixed regions 12A positioned on both sides of the engaging region 13, and the flexibility of the loop member 12 is favorably ensured, which is advantageous in increasing the engagement force of the surface fastener 10. When the ratio L1/L0 is less than 1.01, the length L0 and the length L1 are substantially equal, and thus the loosening of the loop member 12 cannot be ensured and the effect of ensuring the flexibility of the loop member 12 cannot be sufficiently obtained. When the ratio L1/L0 exceeds 1.50, excessive loosening of the loop member 12 may cause the sound absorbing member S to move greatly when traveling, causing the engagement to release. Note that, as illustrated in FIG. 5, in a case in which two or more non-fixed regions 12B including the engaging region 13 are provided, the ratio L1/L0 preferably satisfies in each of the non-fixed regions 12B as illustrated.

Figure 10:
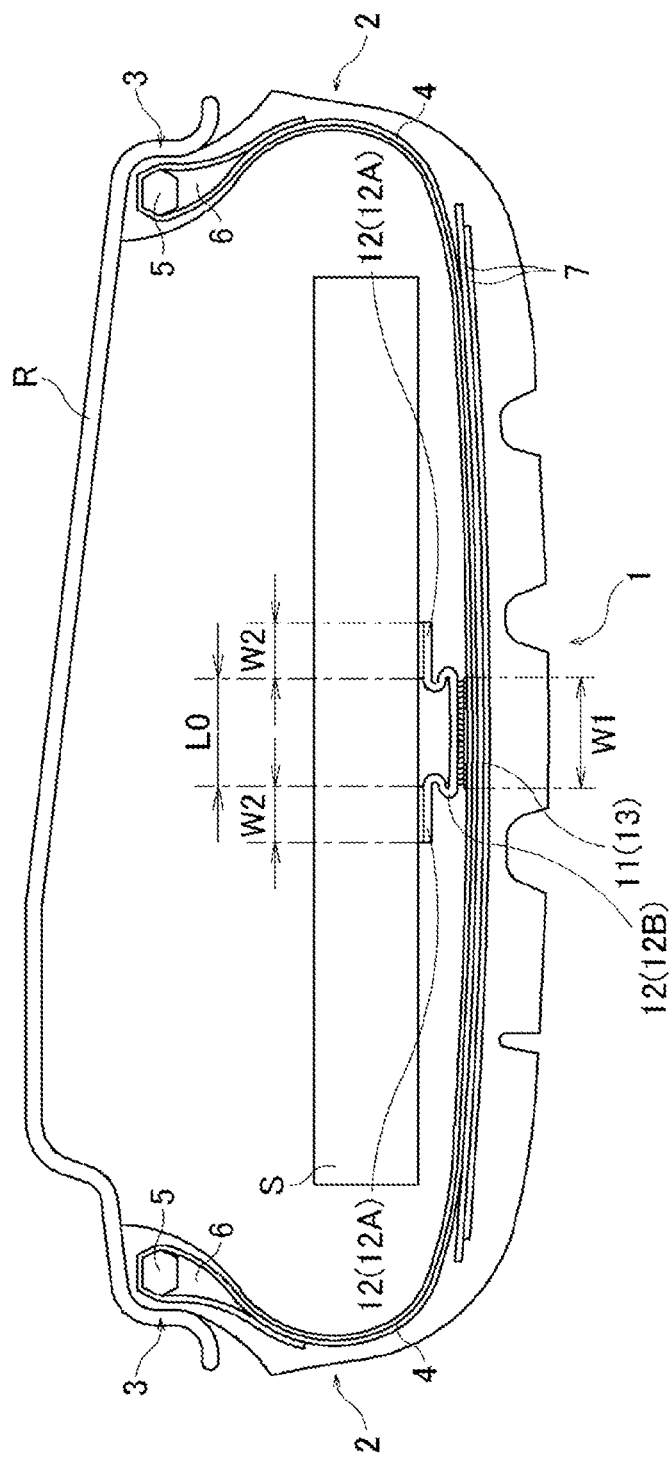
FIG. 10 is a meridian cross-sectional view illustrating a pneumatic tire according to another embodiment of the present technology.
Figure 11:
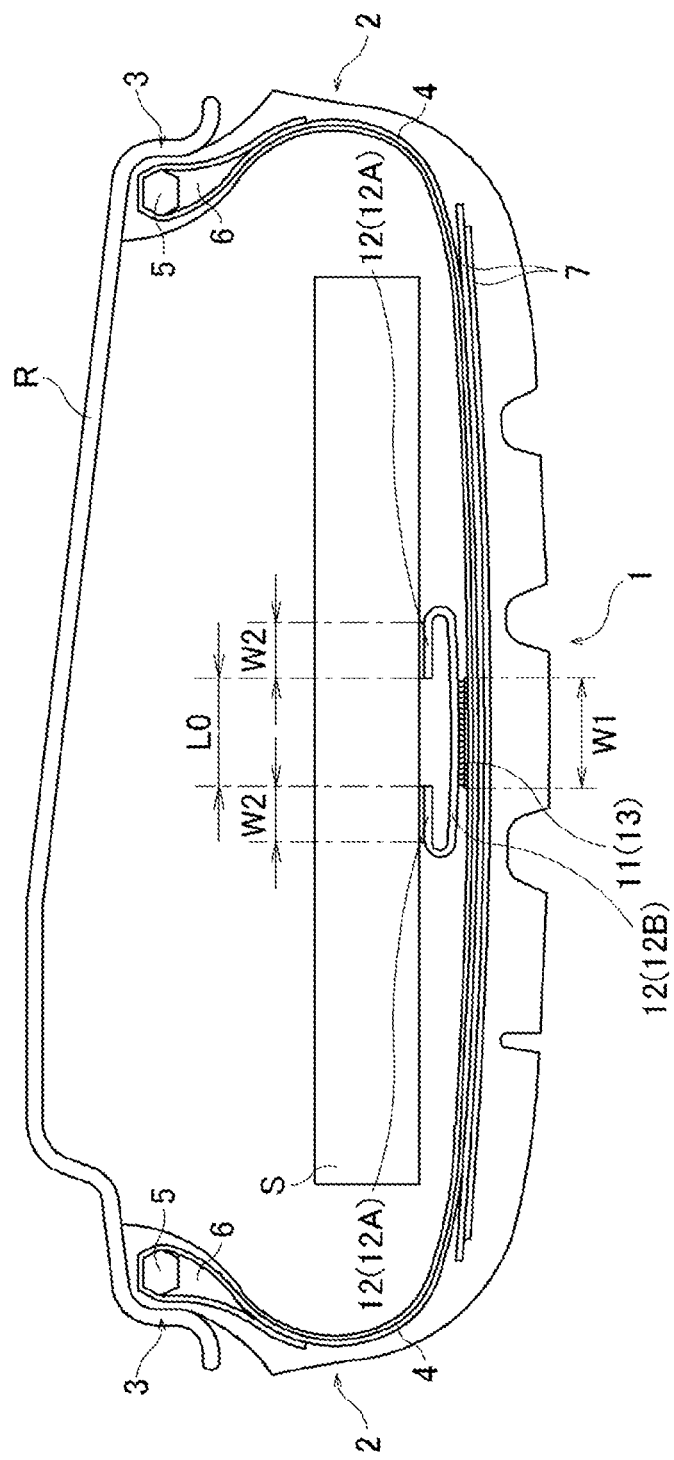
FIG. 11 is a meridian cross-sectional view illustrating a pneumatic tire according to another embodiment of the present technology.

If the ratio L1/L0 satisfies the range described above, flexibility of the loop member 12 can be ensured by loosening of the loop member 12, and thus, as illustrated in FIGS. 10 and 11, the length L0 may be comparable with the width W1 of the engaging region 13 (the hook member 11). In the case of FIG. 10, the length L1 of the non-fixed region 12B is sufficiently large with respect to the length L0 because the loop member 12 (the non-fixed region 12B) that extends to connect the inner ends of the fixed regions 12A in the tire width direction deflect greatly without conforming to the surface of the sound absorbing member S. Additionally, in the aspect of FIG. 11, the end portion of the loop member 12 is positioned on the inner side of the fixed region 12A in the tire width direction, and the loop member 12 extends so as to connect the outer ends of the fixed regions 12A in the tire width direction to allow the length L1 of the non-fixed region 12B to be sufficiently large with respect to the length L0. As in these aspects, when the length L0 is comparable with the width W1 of the engaging region 13 (the hook member 11), for example, the length L0 is from 1.0 times to 1.2 times the width W1 of the engaging region 13 (the hook member 11), the ratio L1/L0 preferably satisfies at least the aforementioned range, and more preferably satisfies a range of from 1.05 times to 1.15 times.

Figure 12:
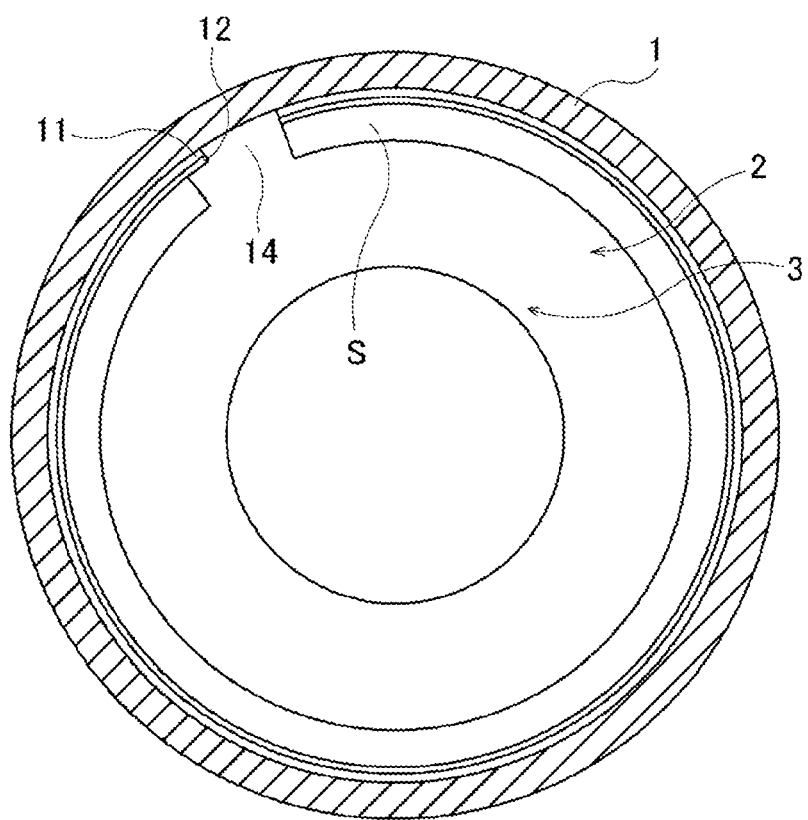
FIG. 12 is a cross-sectional view taken along an equator line of a pneumatic tire according to another embodiment of the present technology.

The sound absorbing member S is preferably a band-like member having the cross-sectional structure illustrated in FIG. 1 and FIGS. 3 to 11 and extending in the tire circumferential direction. Here, as illustrated in FIG. 12, the sound absorbing member S preferably has a missing portion 14 in which the sound absorbing member S is not present in at least one section in the tire circumferential direction. Expansion of the tire during inflation and/or shearing strain due to rolling on the ground can be tolerated for a long period of time by providing such a missing portion 14. The missing portion 14 is preferably provided at 1 position or 3 to 5 positions on the tire circumference. That is, when the missing portions 14 are provided at 2 positions on the tire circumference, tire uniformity due to mass unbalance significantly deteriorates, and when the missing positions 14 are provided at 6 or more positions on the circumference, production cost significantly increases.

When the missing portion 14 is provided as illustrated in FIG. 12, in the loop member 12, the non-fixed regions 12B can be configured to be present throughout the entire length of the band-like member in the longitudinal direction. In other words, by not fixing the loop member 12 along the tire width direction at the end portion facing the missing portion 14, the loop member 12 can have a structure in which the periphery of the loop member 12 does not close in a bag shape (a structure in which the end portion of the loop member 12 facing the missing portion 14 is open). By configuring the non-fixed region 12B to be present regardless of the position in the longitudinal direction (the tire circumferential direction) of the band-like loop member 12 as described above, the flexibility of the loop member 12 can be ensured in the entire region in the longitudinal direction of the band-like member, which is advantageous in increasing the engagement force of the surface fastener 10.

When the missing portion 14 is provided as illustrated in FIG. 12, on at least one end portion of the sound absorbing member S facing the missing portion 14, the loop member 12 preferably protrudes from the sound absorbing member S in the tire circumferential direction as illustrated. Here, the hook member 11 that forms a pair with the loop member 12 has a length corresponding to the loop member 12 (a length greater than or equal to the loop member 12). In this way, while achieving the effect of providing the missing portion 14, because the portion of the loop member 12 protrudes in the tire circumferential direction beyond the sound absorbing member S, the large engagement area of the surface fastener 10 is ensured, which is advantageous in increasing the engagement force of the surface fastener 10.

Figure 13:
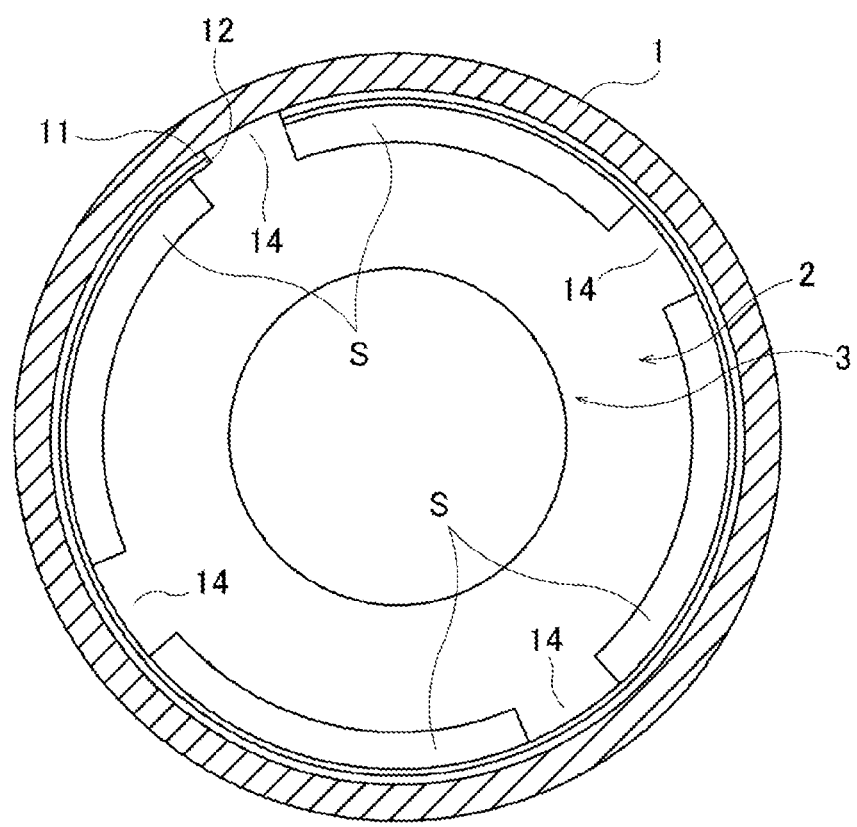
FIG. 13 is a cross-sectional view taken along an equator line of a pneumatic tire according to another embodiment of the present technology.

As illustrated in FIG. 13, a structure in which the missing portions 14 are provided at a plurality of positions can be referred to from a different viewpoint as a structure in which a plurality of the sound absorbing members S are intermittently arranged along the tire circumferential direction. In this structure, a structure in which the loop member 12 described above protruding in the tire circumferential direction can be combined to provide a structure in which a plurality of sound absorbing members S are intermittently disposed on the top (the inner circumferential side) of one loop member 12 extending in the tire circumferential direction. In this structure, while achieving the effect of providing the plurality of missing portions 14, the large engagement area of the surface fastener 10 is ensured, which is advantageous in increasing the engagement force of the surface fastener 10 while increasing the sound absorbing performance, and provide both performances in a highly compatible manner. Note that, in this case as well, the hook member 11 that forms a pair with the loop member 12 has a length corresponding to the loop member 12 (a length greater than or equal to the loop member 12).

Figure 14:
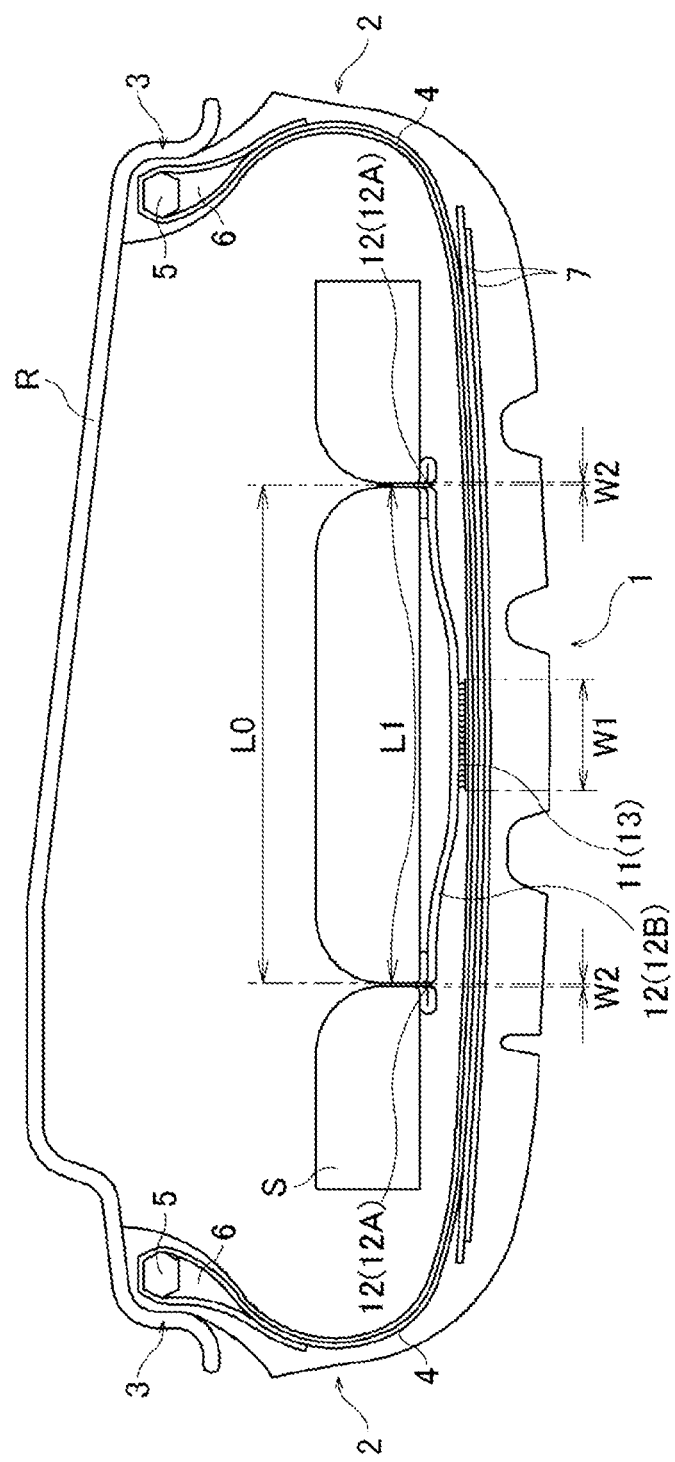
FIG. 14 is a meridian cross-sectional view illustrating a pneumatic tire according to another embodiment of the present technology.

When the loop member 12 includes a fabric material provided with the engaging elements 12e made of loop-shaped fibers, and the loop member 12 is fixed by sewing to the sound absorbing member S, preferably, as illustrated in FIG. 14, the end portion of the loop member 12 in the tire width direction is folded back and the doubled portion of the loop member 12 is to be sewn. As a result, fraying of the ends of the loop member 12 (the fabric material) can be prevented. In addition, by doubling the loop member 12 (the fabric material) in the sewing portion, strength at the sewing portion can be ensured.

The various aspects described above can be appropriately combined and employed depending on the size and structure of the tire, the structure and the required sound absorbing performance of the sound absorbing member, and the structure of the surface fastener 10. In any of the combinations, only the fixed region 12A is partially fixed to the sound absorbing member S without fixing the entire surface of the loop member 12 to the sound absorbing member S, and the fixed region 12A and the engaging region 13 do not overlap, and thus the loop member 12 and the sound absorbing member S are reliably fixed in the fixed region 12A, while the flexibility of the loop member 12B can be maintained without being fixed in the non-fixed region 12B. As a result, when the hook member 11 and the loop member 12 engage with each other in the engaging region 13 disposed in the non-fixed region 12B, the loop member 12 (the non-fixed region 12B) with retained flexibility works well on the hook member 11, thereby increasing the engagement force of the surface fastener 10.

The invention claimed is:

1. A pneumatic tire, comprising:
a tread portion extending in a tire circumferential direction and having an annular shape;
a pair of sidewall portions respectively disposed on both sides of the tread portion; and
a pair of bead portions each disposed on an inner side of the pair of sidewall portions in a tire radial direction;
the pneumatic tire being provided with a sound absorbing member on an inner surface of the tread portion by using a surface fastener;
the surface fastener comprising a pair made up of a hook member and a loop member, the hook member being provided with a plurality of hook-shaped engaging elements on one surface of the hook member and being fixed to the inner surface, and the loop member provided with loop-shaped engaging elements that can engage with the hook-shaped engaging elements and being fixed to the sound absorbing member;
in a meridian cross-section, the loop member having at least one section partially fixed in a tire width direction to the sound absorbing member; and
a fixed region being a region in which the loop member is fixed to the sound absorbing member, a non-fixed region being a region in which the loop member is not fixed to the sound absorbing member, and an engaging region in which the loop member and the hook member engage with each other being disposed only on the non-fixed region.

2. The pneumatic tire according to claim 1, wherein at least a pair of the fixed regions are present on both sides of the non-fixed region comprising the engaging region in the tire width direction.

3. The pneumatic tire according to claim 2, wherein a surface length L0 of a portion of the sound absorbing member that is covered by the loop member between the pair of the fixed regions adjacent to the non-fixed region comprising the engaging region is from 1.2 times to 6.0 times a width W1 of the engaging region.

4. The pneumatic tire according to claim 2, wherein a ratio L1/L0 of a length L1 of the non-fixed region of the loop member to a surface length L0 of a portion of the sound absorbing member which is covered by the loop member between the pair of the fixed regions adjacent to the non-fixed region comprising the engaging region is in a range of from 1.01 to 1.5.

5. The pneumatic tire according to claim 1, wherein the sound absorbing member is a band-like member extending in the tire circumferential direction, and has a missing portion in which the sound absorbing member is not present in at least one section in the tire circumferential direction, and the loop member projects from the sound absorbing member in the tire circumferential direction at least on one end portion of the sound absorbing member facing the missing portion.

6. The pneumatic tire according to claim 3, wherein a ratio L1/L0 of a length L1 of the non-fixed region of the loop member to a surface length L0 of a portion of the sound absorbing member which is covered by the loop member between the pair of the fixed regions adjacent to the non-fixed region comprising the engaging region is in a range of from 1.01 to 1.5.

7. The pneumatic tire according to claim 6, wherein the sound absorbing member is a band-like member extending in the tire circumferential direction, and has a missing portion in which the sound absorbing member is not present in at least one section in the tire circumferential direction, and the loop member projects from the sound absorbing member in the tire circumferential direction at least on one end portion of the sound absorbing member facing the missing portion.

* * * * *